(12) United States Patent
Luby

(10) Patent No.: US 7,267,322 B1
(45) Date of Patent: Sep. 11, 2007

(54) WET WELL VALVE

(75) Inventor: Thomas J. Luby, Copley, OH (US)

(73) Assignee: Nomadics, Inc., Stillwater, OK (US)

( * ) Notice: Subject to any disclaimer, the term of this patent is extended or adjusted under 35 U.S.C. 154(b) by 88 days.

(21) Appl. No.: 10/764,669

(22) Filed: Jan. 26, 2004

Related U.S. Application Data

(60) Provisional application No. 60/442,851, filed on Jan. 24, 2003.

(51) Int. Cl.
*F16K 51/00* (2006.01)

(52) U.S. Cl. .................... 251/149.5; 251/149

(58) Field of Classification Search ............ 251/149.5, 251/149, 343, 344, 144, 345, 309, 321; 137/625.31, 137/625; 73/866.5, 864.64, 863.85
See application file for complete search history.

(56) References Cited

U.S. PATENT DOCUMENTS

| | | | | |
|---|---|---|---|---|
| 3,561,487 A | * | 2/1971 | Reed, Jr. ............... | 137/625.32 |
| 4,320,343 A | * | 3/1982 | Ingram ................ | 324/450 |
| 5,211,202 A | * | 5/1993 | Zink et al. ............ | 137/350 |
| 5,386,845 A | * | 2/1995 | Zink ................... | 137/350 |
| 5,402,821 A | * | 4/1995 | Harstad ............... | 137/556 |
| 5,782,455 A | * | 7/1998 | Burnworth ............ | 251/345 |

OTHER PUBLICATIONS

Dry well "Pockets", www.hathawaycorp.com/productdetail.asp?ID=5 , Qualitrol Corp., Contact Thermometer Maximum Thermometer Pressor Monitor—for Transformers, AB Kihlstr'o'ms Manometerfabrik, Bulletin 47E, 1999, Product Range—AKM Type, dimensions and technical data, www.akmsweden.com.
Immersion Temperature Probe eliminates need for thermal well—PreCon National Sales Co., pp. 2-12, www.industrialnewsroom.com/fullstory/25586.

* cited by examiner

*Primary Examiner*—Justine R. Yu
*Assistant Examiner*—Andrew J. Rost
(74) *Attorney, Agent, or Firm*—Dunlap, Codding & Rodgers, P.C.

(57) ABSTRACT

A valve assembly provides the ability for internal tank operations providing novel and unique methods for intricate measurement, monitoring, sampling, mixing, isolation, evaluation or other tasks desired inside tanks, vessels, piping or flow applications. The valve assembly is supported by the sidewall of the vessel and extends into a cavity of the vessel. The valve assembly including a barrel and a valve member. The barrel has a wall defining a chamber. The wall has at least one opening. The valve member is movable between a closed position and an open position.

17 Claims, 5 Drawing Sheets

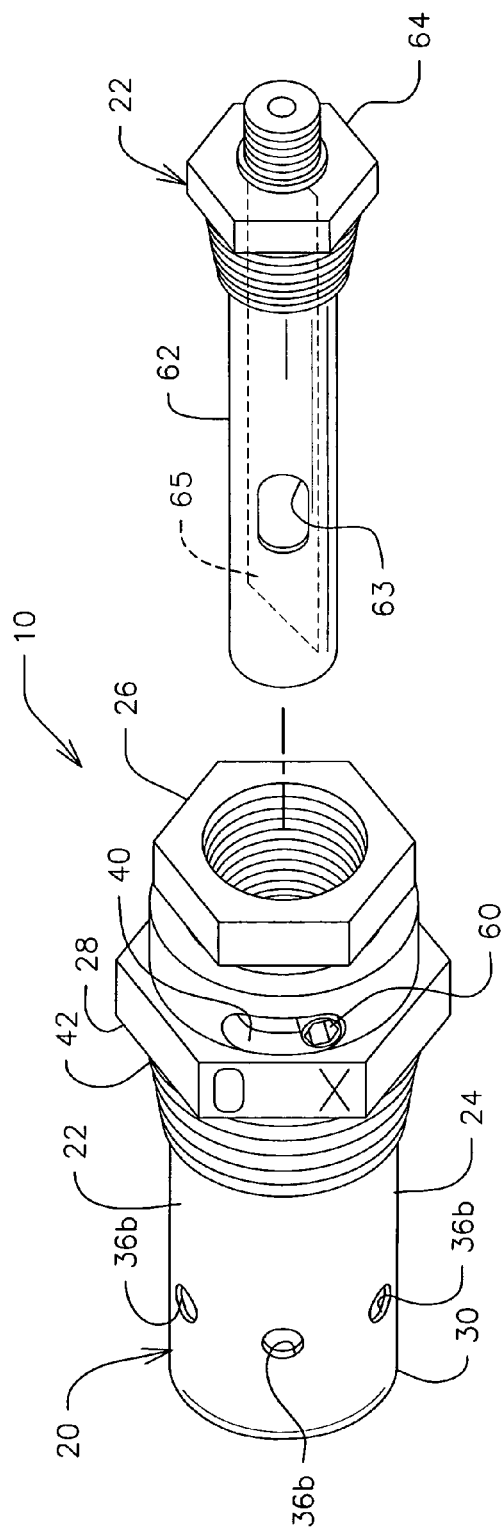
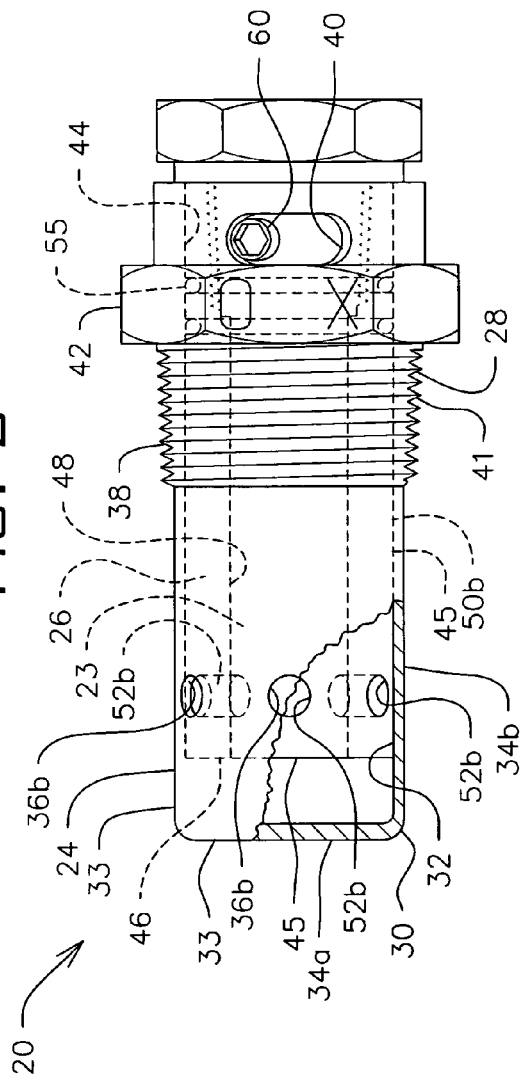
FIG. 2
FIG. 4

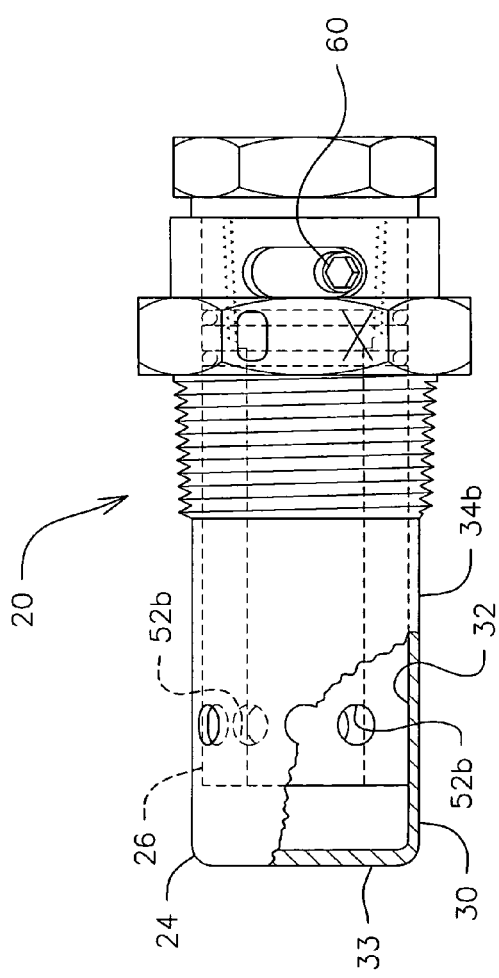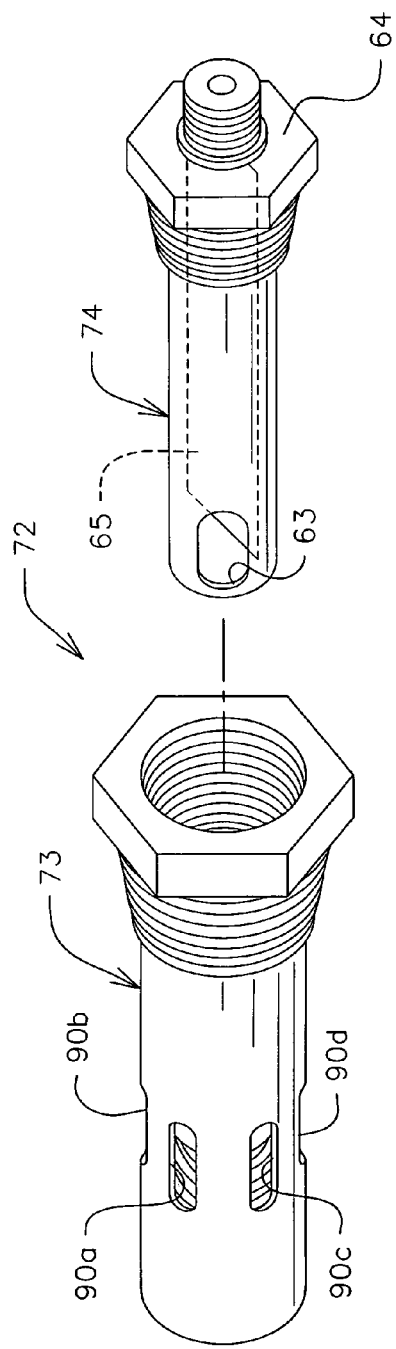

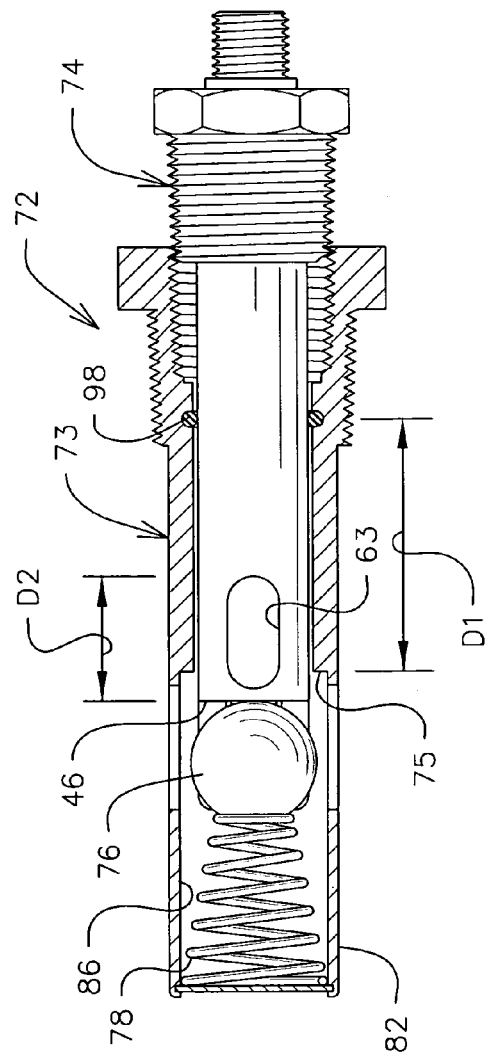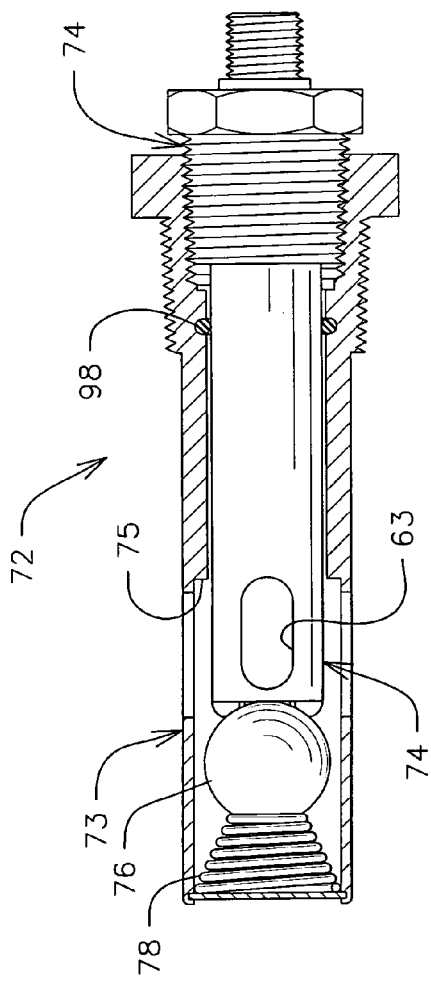

WET WELL VALVE

CROSS REFERENCE TO RELATED APPLICATIONS

This application claims benefit of provisional application U.S. Ser. No. 60/442,851, filed Jan. 24, 2003, entitled "WET WELL VALVE".

BACKGROUND OF THE INVENTION

1. Field of the Invention

The present invention relates generally to valves, and more particularly, but not by way of limitation, to a valve for placing sensors through vessel walls.

2. Brief Description of Related Art

Electrical power transformers of the size and capacity used by commercial power utilities to maintain primary transmission line voltage are normally charged with a petroleum fluid called insulating or dielectric oil for the dual purpose of insulating the primary and secondary transformer windings, each from the other, and also as a cooling medium to remove inductance heat from the proximity of the transformer core and windings.

Such dielectric oil is also used in relays, switches, oil circuit breakers, and other large capacity power transmission equipment. For brevity, the following description will hereafter be related to transformers, but it will be understood that all such oil insulated transmission devices are included.

In operation, the oil reservoir of such transformers is sealed from the atmosphere. However, if the unit is to be moved from one operating location to another, it is often necessary to remove the oil for weight reduction.

Oil is also removed from a transformer periodically to filter an accumulation of colloidally dispersed carbon particles from the fluid which develop due to localized overheating of the hydrocarbon substance in the course of operation.

It is during these occasions of field removal and recharging that opportunity is given for moisture infusion into the system. The primary objection to moisture in the oil charge is that water concentrations above a very low threshold percentage reduce the dielectric characteristic of the oil (increase the conductance) sufficiently to permit arcing across the windings. Consequently, rapid thermal dissociation of the hydrocarbon compounds occurs to generate catastrophic pressure increases within the sealed transformer housing. Transformer explosion is the terminal result.

Although great care is normally taken during the oil charging and cleaning process, precautionary procedures are, nevertheless, subject to occasional human failure. As a result of such occasional failures and the enormous expense for repair or replacement of the damaged equipment, the consequent economic burden is a significant factor in the operating overhead of utility companies.

Transmission units and other hydraulic systems may also become contaminated with water as a result of working in wet or damp environments. Water will cause an increase in both parts of the oil's complex permittivity.

In addition, the oil may be filtered too soon. Other useful properties in the oil allow the oil to be reused.

To this end, a need exists for a valve that will permit the placement of a sensor, detecting oil quality, through a vessel wall without exposing the oil to the environment. It is to such a valve that the present invention is directed.

BRIEF DESCRIPTION OF SEVERAL VIEWS OF THE DRAWINGS

FIG. 2 is an exploded perspective view of a valve assembly and a sensor assembly.

FIG. 3 is a plan view of another embodiment of an end wall of the valve assembly.

FIG. 4 is a partially cut-away elevational view of the valve assembly of FIG. 2 in an open position.

FIG. 5 is a partially cut-away elevational view of the valve assembly of FIG. 2 in a closed position.

FIG. 6 is an exploded perspective view of another embodiment of a valve assembly constructed in accordance with the present invention.

FIG. 8 is a cross-sectional view of the valve assembly of FIG. 6 in a partially open position.

FIG. 9 is a cross-sectional view of the valve assembly of FIG. 6 in the open position.

DETAILED DESCRIPTION OF THE INVENTION

Figure 1:
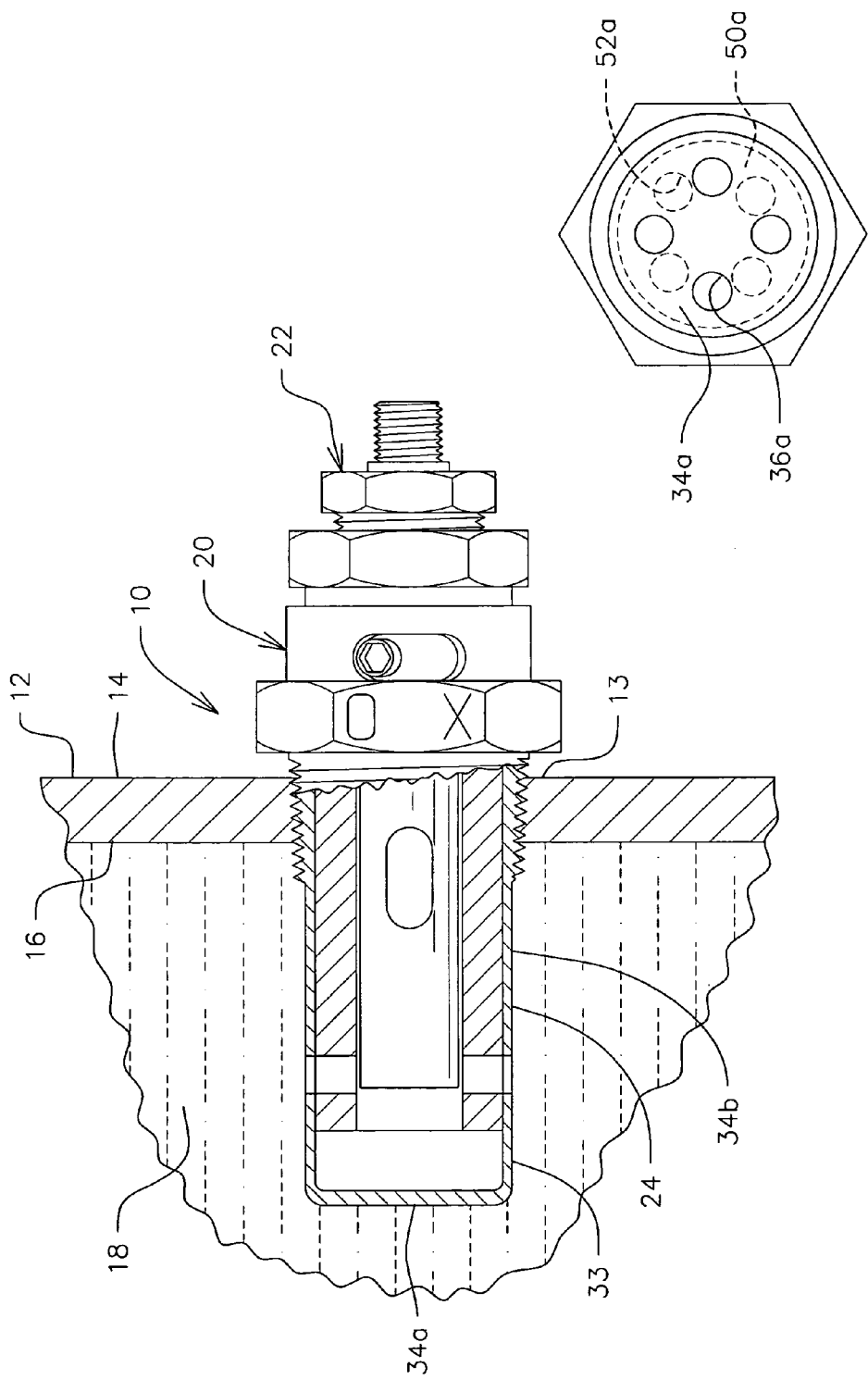
FIG. 1 is a partial cross-sectional view of a valve constructed in accordance with the present invention supported by a vessel.

Referring now to the drawings, and more particularly to FIG. 1, a valve 10 constructed in accordance with the present invention is shown supported by a vessel 12 which in combination forms a vessel assembly 13. The vessel 12 includes a sidewall 14 defining an interior space or cavity 16. The cavity 16 of the vessel 12 contains a fluid 18. The fluid 18 may be any liquid or gas. The vessel 12 may be any tank used for containing and storing fluid. For example, the tank may be a transformer used for storing oil. In addition, the vessel may be a lube oil tank, heater, monitor, pipe, or the like.

Referring to FIGS. 1–4, the valve 10 constructed in accordance with the present invention is shown. Broadly, the valve 10 includes a valve assembly 20 and a sensor assembly 22. The valve assembly 20 is designed to support the sensor assembly 22 in the cavity 16 of the vessel 12 such that the sensor assembly 22 can detect or measure a physical or chemical property of the fluid 18. As will be discussed in more detail below, the valve assembly 20 defines a fluid chamber 23 which can be 1) opened to permit the fluid 18 in the vessel 12 to freely flow about the sensor assembly 22 for monitoring one or more properties of the fluid 18, or 2) closed to prevent the fluid 18 from entering into the fluid chamber 23 to permit removal of the sensor assembly 22 without draining a substantial amount of the fluid 18 in the vessel 12. In one preferred embodiment, the fluid chamber in the valve assembly 20 has a volume of only a few ounces.

The valve assembly 20 includes an outer barrel 24 and an inner barrel 26. The valve assembly 20 extends into the cavity 16 of the vessel 12. The outer barrel 24 is desirably cylindrically shaped and has a proximal end 28, a distal end 30, and a chamber 32 extending longitudinally through the outer barrel 24 from the proximal end 28 to the distal end 30. The outer barrel 24 has a wall 33 defining the chamber 32. The wall 33 may be an end wall 34a or a sidewall 34b. At least one opening 36a (one or more) is formed in the end wall 34a (FIG. 3) or at least one opening 36b is formed in the sidewall 34b (FIGS. 2 and 4) to permit the fluid 18 to pass through wall of the outer barrel 24.

In one preferred embodiment, the outer barrel 24 includes an elongated opening 40 in the sidewall 34b near the proximal end 28 for a purpose to be described hereinafter. The outer barrel 24 is adapted to be supported by the sidewall 14 of the vessel 12. In this regard, the outer barrel 24 is provided with a connection assembly 38 for permitting connection and/or removal of the outer barrel 24 from the sidewall 14 of the vessel 12. In one preferred embodiment, the connection assembly 38 includes threads 41 formed on the outer barrel 24 and an outwardly extending annular flange 42 positioned near the proximal end 28 (for receiving a wrench) to facilitate connection with the vessel 12. Although the connection assembly 38 has been shown herein as threads 41 and the flange 42, it should be understood that the connection assembly 38 can be implemented as any device or configuration for directly or indirectly connecting the outer barrel 24 to the sidewall 14 of the vessel 12. The threads 41 and the flange 42 are an example of a direct connection. Other examples of the direct connection would be a weld, or a cam-lock device. An example of an indirect connection would be bushing positioned between the vessel 12 and the outer barrel 24.

The inner barrel 26 is desirably shaped to mate with the outer barrel 24. When the outer barrel 24 is cylindrically shaped, the inner barrel is desirably cylindrically shaped and has a proximal end 44, a distal end 46, and a chamber 48. The inner barrel 18 has a wall 45 defining the chamber 48. The wall 45 may be an end wall 50a or a sidewall 50b. Herein, the wall 45 is shown as the sidewall 50b. The sidewall 50b is provided with one or more openings 52b. The end wall 50a may also be provided with at least one or more openings 52a.

At least a portion of the inner barrel 26 is positioned within or inserted into the chamber 32 of the outer barrel 24. O-rings 55 are optionally provided to create a seal between the outer barrel 24 and the inner barrel 26, however, some leakage between the outer barrel 24 and the inner barrel 26 may be acceptable. Further, the inner barrel 26 and the outer barrel 24 may be constructed to very close dimensions thereby eliminating the need for the O-ring. In this embodiment, the inner barrel 26 may be pre-cooled and then inserted into the outer barrel 24.

A closure member 60 is inserted through the elongated opening 40 of the outer barrel 24 and attached near the proximal end 44 of the inner barrel 26 so as to permit movement of the inner barrel 26 between an open position (FIG. 4.) and a closed position (FIG. 5).

Referring to FIG. 3, the valve assembly 20 is shown in the closed position. such that the openings 36a and 52a are not in fluid communication. In one preferred embodiment, the inner barrel 26 is rotated so that the openings 52a of the inner barrel 26 are misaligned with the openings 36a of the outer barrel 24. The openings 52a in the inner barrel 26 are aligned with the endwall 34a of the outer barrel 24. Thus, a portion of the wall of the inner barrel 26 closes or seals the opening(s) 36a in the outer barrel 24 thereby preventing fluid from flowing into the chamber 48 of the inner barrel 26. In the open position (not shown), the openings 36a and 52a are aligned so as to be in fluid communication.

Referring to FIG. 4, the valve assembly 20 is shown in the open position. The opening(s) 36b formed in the sidewall 34b of the outer barrel 24 and the opening(s) 52b formed in the sidewall 50b of the inner barrel 26 are brought into fluid communication. In one preferred embodiment, the openings 36b and 52b are aligned by rotating the inner barrel 26 in the chamber 32 of the outer barrel 24.

In FIG. 5, the valve assembly 20 is shown in the closed position such that the openings 36b and 52b are not in fluid communication. In the preferred embodiment, the inner barrel 26 is rotated so that the openings 52b of the inner barrel 26 are misaligned with the openings 36b of the outer barrel 24. The openings 52b in the inner barrel 26 are aligned with the sidewall 34b of the outer barrel 24. Thus, a portion of the wall of the inner barrel 26 closes or seals the opening(s) 36b in the outer barrel 24 thereby preventing fluid from flowing into the chamber 48 of the inner barrel 26.

It should be understood that the valve assembly 20 can be provided with any type of valve member which is movable between the open and closed positions for permitting the flow of fluid from the vessel 12 to a sensor in the open position, and preventing the flow of fluid from the vessel 12 to the sensor in the closed position can be used. That is, although the valve assembly 20 has been shown and described above as having the outer and inner barrels 24 and 26 which are movable for permitting and preventing the fluid 18 from passing into the fluid chamber 23, the valve assembly 20 could be constructed in other manners. For example, the inner barrel 26 can be eliminated, and a slidable valve member, such as a plate, can be provided for opening or closing the opening 36 in the outer barrel 24. In the preferred embodiment shown in FIGS. 2 and 4, the wall of the inner barrel 26 forms the valve member.

As shown in FIGS. 1–2, the sensor assembly 22 includes a housing 62 and an end cap 64. The housing 62 or the end cap 64 supports a sensor 65. The housing 62 can surround at least a portion of the sensor 65, if desired. The housing 62 is optionally provided with an opening 63 which allows fluid to contact or otherwise communicate with the sensor 65. The housing 62 is inserted into the chamber 48 of the inner barrel 26. Any variety of sensor, such as an oil quality sensor may be used in the sensor assembly 22. For example, the oil quality sensor can be used for detecting temperature, viscosity, pressure, moisture content, and other physical and chemical properties.

The end cap 64 is adapted to connect to the inner barrel 26 or the outer barrel 24. For example, the end cap 64 can be adapted to threadingly engage the proximal end 44 of the inner barrel 26. The end cap 64 may be provided with an annular groove for receiving a seal member, such as an o-ring, to effect a fluid-tight seal between the inner barrel 26 and the end cap 64.

As shown in FIGS. 1,2,4–5, to utilize the sensor assembly 22, the housing 62 of the sensor assembly 22 is inserted into the chamber 48 of the inner barrel 26. The valve assembly 20 is moved to the open position by rotating the inner barrel 26 so that the openings 52b of the inner barrel 26 are aligned with the openings 36b of the outer barrel 24. The open position allows the flow of fluid inside the vessel 12 (FIG. 1) to come in contact with the sensor whereby sensor readings can be read. To remove the sensor assembly 22, the valve assembly 20 is moved to the closed position (FIG. 5) and the sensor assembly 22 is removed from the chamber 48 of the inner barrel 26.

In FIGS. 6–9, another embodiment of a valve assembly 72 is shown. The valve assembly 72 includes an outer barrel 73, an inner barrel 74, a valve seat 75, a valve member 76, and a biasing assembly 78. In this embodiment, the sensor housing 62 of the sensor assembly 22 forms the inner barrel 74 of the valve assembly 72.

The outer barrel 73 has a proximal end 80, a distal end 82, and a wall 84. The wall 84 defines a chamber 86. The wall 84 may be an end wall 88a or a sidewall 88b. Herein by way of example, one or more openings 90a, 90b, 90c or 90d are formed in the endwall 88a and/or the sidewall 88b. For example, the openings 90a, 90b, 90c and 90d are formed in the sidewall 88b.

The valve seat 75 is defined by an internal shoulder positioned in the chamber 86 of the outer barrel 73, or an external shoulder. The valve seat 75 is positioned between the proximal end 80 and the distal end 82. The valve seat 75 desirably faces the distal end 82 of the outer barrel 73 so as to provide the chamber 86 with a first portion 94 and a second portion 96. The second portion 96 of the chamber 86 of the outer barrel 73 has a diameter greater than that of the first portion 94 of the chamber 86 of the outer barrel 73, by way of example, to form the valve seat 75.

The valve member 76 is desirably positioned in the second portion 96 of the chamber 86 of the outer barrel 73. The valve member 76 is shown by way of example as a ball. However, the valve member 76 may be any type of device capable of controlling the flow of fluid.

The biasing member 78 is shown by way of example as a spring, but could be any device or assembly for biasing the valve member 76 against the valve seat 75. For example, the valve member 76 can be constructed of a ferrous metal such as steel or iron, and a magnet can be incorporated into the valve seat 75.

In the preferred embodiment, the valve assembly 72 is moved between the open and closed positions upon insertion of the inner barrel 74 into the chamber 86 of the outer barrel 73. In this instance, the inner barrel 74 is provided with certain preselected critical dimensions as will be discussed in more detail below.

Figure 7:
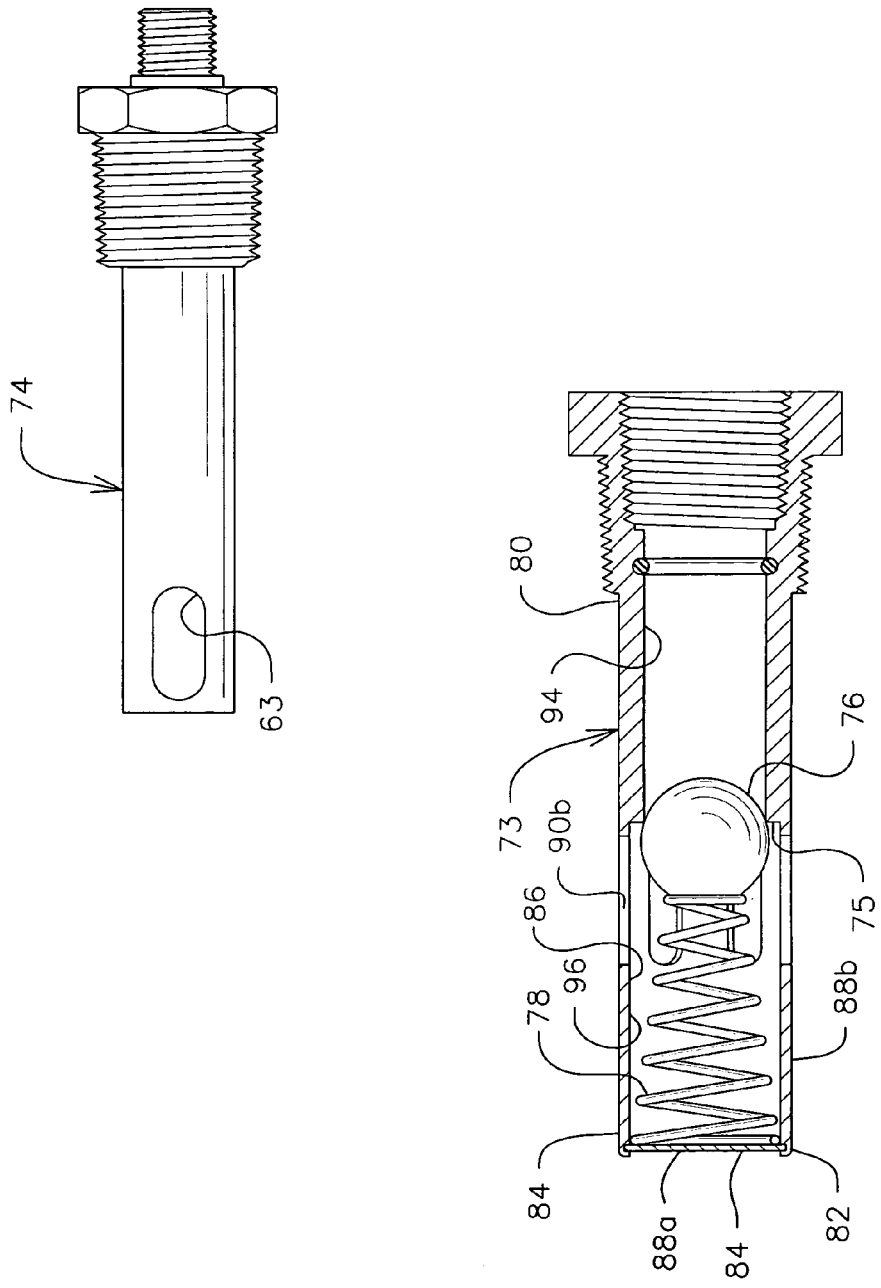
FIG. 7 is cross-sectional view of the valve assembly of FIG. 6 in a closed position.

Referring to FIG. 7, the valve assembly 72 is shown in the closed position. The biasing assembly 78 biases the valve member 76 against the valve seat 75, preventing fluid contact with the inner barrel 74.

In FIGS. 8–9, the open position of the valve assembly 72 is shown. The proximal end 80 of the outer barrel 73 is internally threaded so as to facilitate connection with the inner barrel 74. The inner barrel 74 is inserted into the chamber 86 of the outer barrel 73, thus pushing the valve member 76 off of the valve seat 75 allowing fluid to flow between the valve member 76 and the valve seat 75, and thus through the openings 90a–90d allowing the fluid to flow about the sensor.

The inner barrel 74 is provided with the opening 63 to facilitate the flow of fluid to the sensor, as discussed above. To prevent inadvertent leakage of fluid 18 from the vessel 12 through the valve assembly 72, the relative distances between the valve seat 75 and a seal member 98 (shown in FIG. 8 as D1), and the distal end 46 of the inner barrel 74 and the opening 63 (shown in FIG. 8 as D2) is critical. That is, D1 is greater than D2 so that fluid 18 will not flow out of the opening 63 upon insertion of the inner barrel 74 into the outer barrel 73.

It will be apparent to one skilled in the art that many modifications can be made to the structure of the valve assemblies 20 and 72 while permitting the valve assemblies 20 and 72 to function as described herein. For example, although the openings 36, 52, and 90 in the outer barrels 24 and 73 and the inner barrels 26 and 74, respectively, have been shown as circular, it should be understood that the openings 36, 52, and 90 can be provided with other shapes, such as rectangular, triangular or any other symmetric, assymetric or fanciful shape. For example, the openings 36, 52, and 90 can be configured into animal shapes, if desired.

Furthermore, although the movement between the inner barrel 26 and the outer barrel 24 has been described as rotational movement, other types of movement could be provided. For example, the inner and outer barrels 26 and 24 can be designed for axial movement, i.e., push-pull movement. Alternatively, by varying the shape of the elongated opening 40, the inner and outer barrels 26 and 24 can be moved in a combination of rotational and axial movement.

In addition, although the inner and outer barrels 26 and 24, respectively, and 74 and 73, respectively, have been shown and described as having a cylindrical shape, in some embodiments of the present invention this is not necessary. For example, the inner and outer barrels 26 and 24, respectively, and 74 and 73, respectively, can be provided with rectangular shapes, in the push-pull movement embodiment discussed above.

Although the valve assemblies 20 and 72 and the sensor 65 have been described herein for use in the electrical utility industry for monitoring the oil in transformers, it should be understood that the valve assemblies 20 and 72 and the sensor 65 can be mounted on any type of vessel for monitoring any type of fluid. For example, the valve assemblies 20 and 72 can be utilized in any tank, vessel, piping or flow applications, for any fluid property measurement for liquid or gas in storage, processing or dynamic applications like pressure, temperature, acoustic, moisture, dielectric value, color, ph, flow rates, particle size, particle count, content measurement, mixture evaluation, contaminant measurement, tribology assessment, level measurement, partial discharge, or any other physical, chemical, electrical, photographic, or thermal parameter.

The valve assemblies 20 and 72 can be utilized as a means of sampling inside a vessel. For example, the sensor assembly 22 is desirably removed and a fitting such as a stop-cock may be attached to the valve assembly 20 or 72 to withdraw a liquid or gas sample.

The valve assemblies 20 and 72 can further be utilized as a means for mixing additives, conditioners, energy, thermal streams or any material liquid, gas or solid that is desired to be added, dissolved, diluted or otherwise distributed into a tank, vessel, piping or flow system. For example, the sensor assembly 22 is desirably removed, and an injector device for adding materials can be attached to the valve assembly 20 or 72.

Additionally, the valve assemblies 20 and 72 can be utilized as a means of isolating a chamber within a tank, vessel, piping or flow system to expedite or simplify periodic maintenance by eliminating the need to drain fluids inside the vessel and to remove components within the fluid system. For example, a device such as a heating element may be placed in the chamber of the valve assembly 20 or 72 so as to determine and control the heat output of the liquid or gas contained inside the vessel. In addition, a level switch may be placed in the chamber so as to determine the level of the liquid inside the vessel. Alternatively, a camera or video camera can be positioned within the valve assembly 20 or 72 with the lens aligned with one of the openings in the valve assembly 20 or 72 so that internal pictures of the vessel can be taken.

Furthermore, it should be understood that although the valve assemblies 20 and 72 have been described herein as having a single chamber, it should be understood that the valve assemblies 20 and 72 can be designed with two or more separate chambers, if desired. These multiple chambers, for example 2–4 chambers, can be formed with dividing wall(s) either length-wise axially, radially, or concentric separations of chambers, or other means of separating a volume. For example, a dividing wall having a "+" shaped cross-section can be placed within the chamber to form four separate or isolated chambers within the valve assembly 20 or 72.

As will be understood by one skilled in the art in view of the above, the attached drawings and appended claims, the valve assemblies 20 and 72 provide the ability for internal tank operations that provide novel and unique methods for intricate measurement, monitoring, sampling, mixing, isolation, evaluation or other tasks desired inside tanks, vessels, piping or flow applications.

The foregoing is considered as illustrative only of the principles of the invention. Further, since numerous modifications and changes will readily occur to those skilled in the art, it is not desired to limit the invention to the exact construction and operation shown and described above. Therefore, changes may be made in the combinations, operations, and arrangements of the various parts and elements described herein without departing from the spirit and the scope of the invention as defined in the following claim.

What is claimed is:

1. A vessel assembly, comprising:
    a vessel having a sidewall defining a cavity containing a fluid;
    a valve assembly supported by the sidewall of the vessel and extending into the cavity of the vessel, the valve assembly, comprising:
        a barrel having an outer barrel, the barrel having a wall defining a chamber, the wall having at least one opening; and
        a valve member having an inner barrel threaded for receiving a sensor assembly, the threaded inner barrel having a wall having at least one opening therein, the valve member movable between a closed position and an open position wherein, when the valve member is positioned in the open position, the at least one opening in the wall of the inner barrel is aligned with and in fluid connection with the at least one opening in the wall of the outer barrel whereby fluid is permitted to flow into the chamber, and when the valve member is positioned in the closed position, the at least one opening in the wall of the inner barrel of the valve member is aligned with the wall of the barrel whereby fluid is prevented from flowing into the chamber.

2. The vessel assembly of claim 1 wherein the wall of the barrel is provided with an elongated opening.

3. The vessel assembly of claim 2 wherein a closure member is inserted into the elongated opening of the wall of the barrel to permit movement of the valve member between the closed position and the open position.

4. The vessel assembly of claim 1 wherein at least one of the inner barrel and the outer barrel is adapted to rotate relative to the other one of the inner barrel and the outer barrel for moving the valve assembly between the open and closed position.

5. The vessel assembly of claim 1 wherein the wall of the barrel is threaded.

6. The vessel assembly of claim 1 wherein the walls of the inner and outer barrels have sidewalls.

7. The vessel assembly of claim 1 wherein the walls of the inner and outer barrels have end walls.

8. The vessel assembly of claim 1 wherein the wall of the inner barrel has a sidewall and the wall of the outer barrel has an end wall.

9. The vessel assembly of claim 1 wherein the wall of the inner barrel has an end wall and the wall of the outer barrel has a sidewall.

10. The vessel assembly of claim 1 wherein the fluid is defined as oil.

11. The vessel assembly of claim 1 wherein the vessel is a transformer housing.

12. The vessel assembly of claim 1 wherein the vessel is defined as a pipe.

13. The vessel assembly of claim 1 wherein an o-ring is positioned between the inner and outer barrels.

14. The vessel assembly of claim 1 wherein the at least one opening in the wall of the barrel is an elongated opening.

15. A device for obtaining sensor readings within a container having a sidewall defining a cavity and containing a fluid, the device comprising:
    a sensor assembly for detecting or measuring a physical or chemical property of the fluid; and
    a valve assembly adapted to be supported by the sidewall of the container such that at least a portion of the valve assembly extends into the cavity of the container, the valve assembly, comprising:
        a barrel having a wall defining a chamber, the wall having at least one opening; and
        a valve member having an inner barrel threaded for receiving the sensor assembly, the wall of the inner barrel having at least one opening therein, the valve member movable between a closed position and an open position wherein when the valve member is positioned in the open position the at least one opening in the wall of the inner barrel is aligned with and in fluid connection with the at least one opening in the wall of the outer barrel whereby fluid is permitted to flow into the chamber, and when the valve member is positioned in the closed position the at least one opening in the wall of the inner barrel of the valve member is aligned with the wall of the barrel whereby fluid is prevented from flowing into the chamber.

16. A valve assembly, comprising:
    a barrel having a wall defining a chamber having at least one opening, the barrel adapted to be supported by a sidewall of a container containing a fluid such that a portion of the wall having the at least one opening extends into the container; and
    a valve member having an inner barrel threaded for receiving a sensor assembly, the threaded inner barrel having a wall containing at least one opening therein, the valve member movable between a closed position and an open position wherein when the valve member is positioned in the open position the at least one opening in the wall of the inner barrel is aligned with and in fluid connection with the at least one opening in the wall of the outer barrel whereby the fluid is permitted to flow into the chamber, and when the valve member is positioned in the closed position the at least one opening in the wall of the inner barrel of the valve member is aligned with the wall of the barrel whereby fluid is prevented from flowing into the chamber.

17. The valve assembly of claim 16, wherein the barrel is characterized as an outer barrel, and wherein the valve member having the threaded inner barrel is disposed within the chamber of the outer barrel.

* * * * *